United States Patent
Quijano et al.

(10) Patent No.: US 8,596,702 B2
(45) Date of Patent: Dec. 3, 2013

(54) SLIDABLE TRAY WITH ANTI-JAMMING FEATURE

(75) Inventors: Jonathan Joseph Quijano, Ann Arbor, MI (US); Que-Whang Rhee, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/435,694

(22) Filed: Mar. 30, 2012

(65) Prior Publication Data

US 2013/0257078 A1   Oct. 3, 2013

(51) Int. Cl.
B60R 13/00   (2006.01)

(52) U.S. Cl.
USPC ...................................... 296/24.34

(58) Field of Classification Search
USPC .............. 296/24.34, 37.8, 37.12; 211/126.15; 206/315.11, 562; 229/904
See application file for complete search history.

(56) References Cited

U.S. PATENT DOCUMENTS

| | | | |
|---|---|---|---|
| 4,564,930 A * | 1/1986 | Funabashi et al. | 720/601 |
| 5,037,165 A * | 8/1991 | Rapp et al. | 312/330.1 |
| 5,443,311 A * | 8/1995 | Kadlecek et al. | 312/308 |
| 5,738,423 A * | 4/1998 | Alfaro | 312/290 |
| 6,099,099 A | 8/2000 | Shufelt et al. | |
| 6,851,736 B1 * | 2/2005 | Klopp et al. | 296/37.8 |
| 6,921,118 B2 * | 7/2005 | Clark et al. | 296/24.34 |
| D529,290 S | 10/2006 | Schloss | |
| 7,165,798 B2 * | 1/2007 | Chamberlain et al. | 296/37.1 |
| 7,407,210 B2 * | 8/2008 | Arbaugh et al. | 296/24.34 |
| 7,431,365 B2 * | 10/2008 | Sturt et al. | 296/24.34 |
| 7,530,615 B2 * | 5/2009 | Ogura | 296/24.34 |
| 7,533,918 B2 * | 5/2009 | Spykerman et al. | 296/24.34 |
| 7,568,601 B2 * | 8/2009 | Kogami et al. | 224/483 |
| 7,568,749 B2 * | 8/2009 | Biggs et al. | 296/37.8 |
| 7,614,678 B2 * | 11/2009 | Agarwal et al. | 296/37.1 |
| 7,699,414 B1 | 4/2010 | Shevrin | |
| 7,708,328 B2 * | 5/2010 | Doom et al. | 296/37.12 |
| 7,770,952 B2 * | 8/2010 | Hanzel | 296/24.34 |
| 8,196,985 B2 * | 6/2012 | Penner et al. | 296/24.34 |
| 8,322,671 B2 * | 12/2012 | Myers et al. | 248/311.2 |
| 8,474,897 B1 * | 7/2013 | Jackson | 296/37.8 |
| 8,491,028 B2 * | 7/2013 | Trivedi | 296/24.34 |
| 8,505,994 B2 * | 8/2013 | Park et al. | 296/24.34 |
| 2009/0058120 A1 * | 3/2009 | Ioka et al. | 296/24.34 |
| 2010/0156128 A1 * | 6/2010 | Dexter et al. | 296/24.34 |
| 2010/0314896 A1 * | 12/2010 | Skibinski et al. | 296/24.34 |
| 2011/0068598 A1 * | 3/2011 | Penner | 296/37.8 |
| 2012/0061983 A1 * | 3/2012 | Seiller et al. | 296/24.34 |
| 2012/0119534 A1 * | 5/2012 | Shimozaki | 296/24.34 |

FOREIGN PATENT DOCUMENTS

GB   2427539   9/2008

* cited by examiner

*Primary Examiner* — Kiran B Patel
(74) *Attorney, Agent, or Firm* — Gifford, Krass, Sprinkle, Anderson & Citkowski, P.C.

(57) ABSTRACT

A slidable tray assembly that covers and uncovers a compartment and has an anti-jamming feature. The slidable tray assembly can include a console with a compartment and a panel that can slide and extend over the compartment when in a closed position. The panel can be attached to the console and be operable to slide between the closed position and an open position. In addition, the panel can have a plurality of spaced-apart protrusions extending therefrom and the plurality of spaced-apart protrusions prevent an object from becoming jammed or located between the panel and the console and thus prevent jamming of sliding movement of the panel.

11 Claims, 3 Drawing Sheets

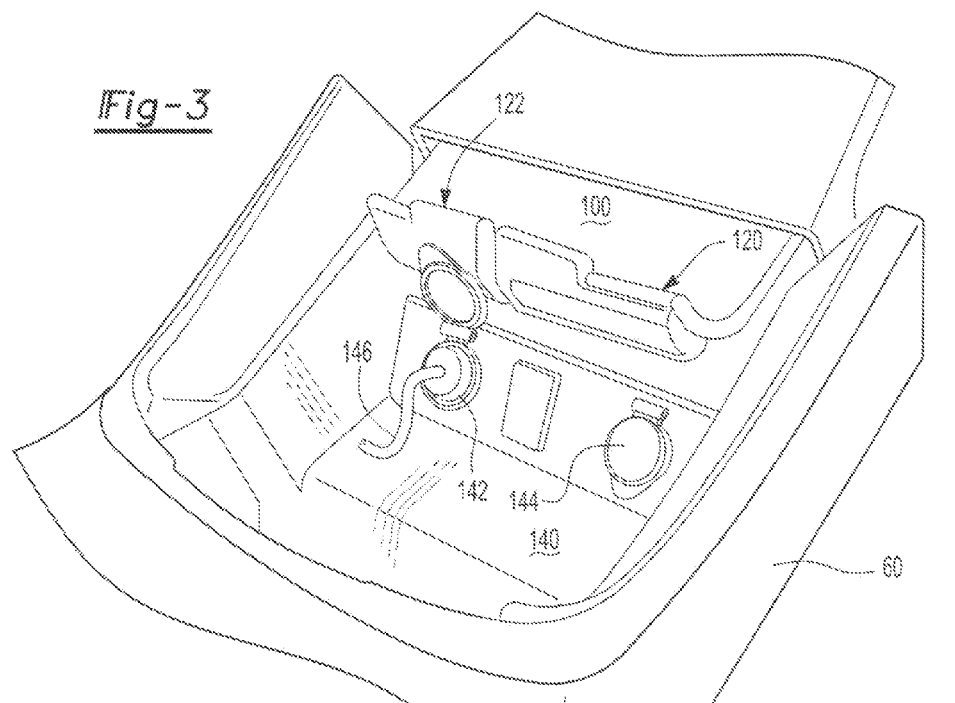
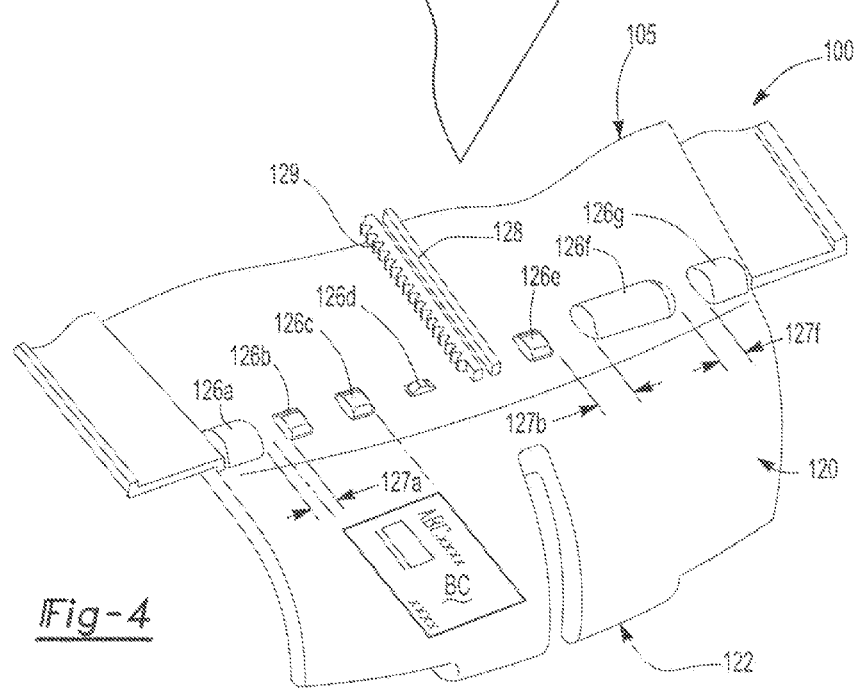

US 8,596,702 B2

SLIDABLE TRAY WITH ANTI-JAMMING FEATURE

FIELD OF THE INVENTION

The present invention is related to a slidable tray, and in particular to a slidable tray having an anti jamming feature.

BACKGROUND OF THE INVENTION

Trays that can slide to cover and uncover a storage compartment are known. For example, consoles within motor vehicles typically have at least one storage compartment for placing items such as pencils, pens, receipts, business cards, coins, and the like. Such a compartment can have a cover or tray that slides from a closed position in which the tray covers and/or encloses the compartment and an open position which provides an opening and access to the compartment.

The compartment, and the slidable tray, can be a convenience to a user of the motor vehicle, but continued use can result in the compartment becoming cluttered and full of various items. In addition, items such as spare change, writing utensils, etc. are known to be placed on top of the slidable tray.

It is appreciated that jamming of the slidable movement of the tray can occur when one or more items stored in the compartment and/or on the tray become located between the tray and the surrounding console. As such, a slidable tray that can cover and uncover a compartment, and has an anti-jamming feature, would be desirable.

SUMMARY OF THE INVENTION

A slidable tray assembly that covers and uncovers a compartment and has an anti-jamming feature is disclosed. The slidable tray assembly can include a console with a compartment and a panel that can slide and extend over the compartment when in a closed position. The panel can be attached to the console and be operable to slide between the closed position and an open position. In addition, the panel can have a plurality of spaced-apart protrusions extending therefrom and the plurality of spaced-apart protrusions prevent an object from becoming jammed or located between the panel and the console and thus prevent jamming of sliding movement of the panel.

In some instances, the panel can have a generally planar bottom surface and the plurality of spaced-apart protrusions can extend therefrom. In addition, the compartment can have an upper surface and/or edge with a plurality of spaced-apart depressions that are complementary and in alignment with the protrusions extending from the panel bottom surface. The protrusions of the panel and the depressions of the compartment prevent an object such as a business card, a credit card, a piece of jewelry, an electronic cable, and the like from becoming located between the panel bottom surface and the upper surface and/or edge of the compartment. In this manner, jamming of the slidable movement of the panel is prevented.

In other instances, the panel can have a side rail that is slidingly engaged with the console and operable to slide between the closed position and the open position. In addition, the side rail has the plurality of spaced-apart protrusions and the protrusions are operable to force or urge a planar circular object located on the side rail to roll towards the compartment when the panel is moving from the closed position to the open position.

The plurality of spaced-apart protrusions on the side rail can be a plurality of inclined steps and each of the steps can have a step surface or face extending upwardly from a top surface of the side rail and an inclined surface extending from the step surface downwardly towards the top surface of the side rail. In addition, the step surface can face the compartment and the inclined surface can slope downwardly from a top edge of the step surface to a top surface of the side rail in a forward direction.

The panel can have a tray portion and a crevice can be present between the tray portion and the console such that the side rail is located at least partially between the tray portion and the console and bounds a bottom portion of the crevice. Furthermore, the planar circular object can be a coin that is located within the crevice and the coin can be forced or urged to roll back towards the compartment when the panel slides in the forward direction from the closed position to the open position. The side rail can also have a flange that bounds the plurality of inclined steps, the flange being a generally vertical flange that extends along a length of the side rail.

BRIEF DESCRIPTION OF THE FIGURES

FIG. 3 is a perspective view of a compartment that is located below the slidable tray according to an embodiment of the present invention;

FIG. 4 is a perspective view of a bottom surface of the slidable tray shown in FIGS. 1-3;

DETAILED DESCRIPTION OF THE PRESENT INVENTION

Figure 1:
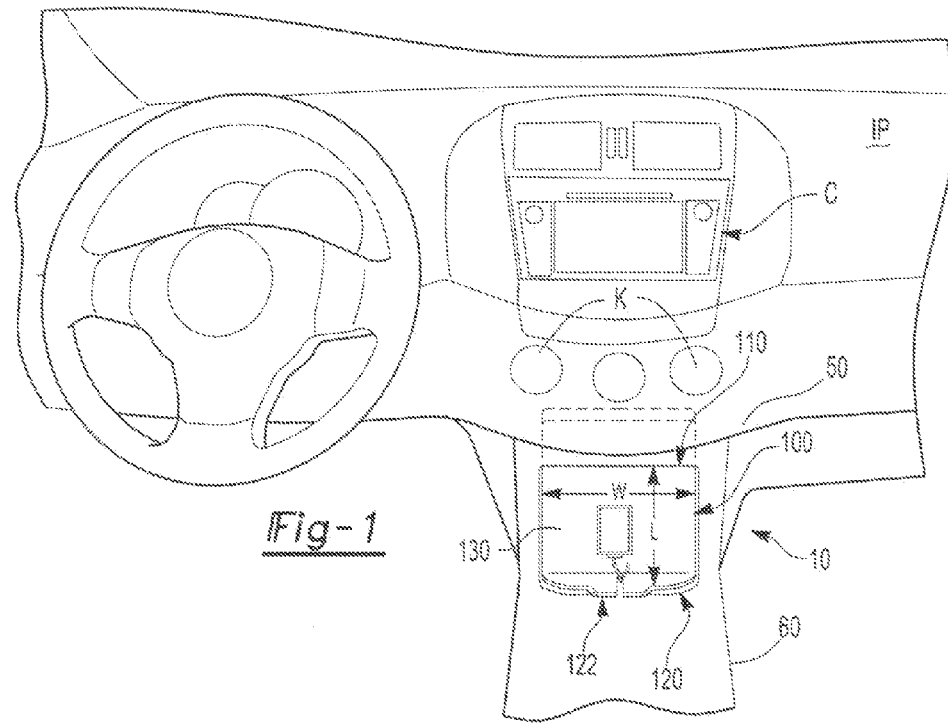
FIG. 1 is a front view of an instrument panel and a slidable tray assembly according to an embodiment of the present invention.

A slidable tray assembly with an anti-jamming feature is disclosed. As such, the slidable tray assembly has utility as a component for a motor vehicle.

The slidable tray assembly can include or be part of a console that has a storage compartment and a panel or tray that can slide and extend over the compartment when in a closed position. The panel can be attached to the console and be operable to slide between the closed position and an open position, the open position affording uncovering of and access to the compartment. The panel has a plurality of spaced-apart protrusions that extend therefrom and the protrusions can prevent an object from becoming located or jammed between the panel and the console, and thereby prevent jamming of the panel's slidable movement.

In some instances, the plurality of spaced-apart protrusions extend from a bottom surface of the panel. The protrusions can be spaced apart from each other such that openings or spaces between the protrusions are less than the width of an object such as a business card, a credit card, and the like. Complementary with the plurality of spaced-apart protrusions can be an upper surface or edge of the compartment that matches with the bottom surface of the panel, the upper surface or edge having a plurality of spaced-apart depressions that allow for the protrusions of the panel to slide therethrough. This complementary set of protrusions and depressions prevents an object stored within the compartment such as a business card, a credit card, an electronic cable, etc. from becoming located and/or jammed between the bottom surface of the panel and the upper portion, surface, or edge of the compartment and thus provides an anti-jamming feature with respect to slidable movement of the panel.

The anti-jamming feature can also be in the form of a side rail that has the plurality of spaced-apart protrusions extending therefrom. The side rail can be part of the panel and be slidingly engaged with the console such that the slide rail, along with the panel, can slide between the closed position and the open position. The plurality of spaced-apart protrusions are operable for a planar circular object such as a coin to be forced or urged to roll in an opposite direction of the panel when it is moving or sliding from the closed position to the open position.

The rolling of the planar circular object can be in a direction towards the compartment and the coin can eventually fall into the compartment. In addition, rolling of the planar circular object can prevent the object from becoming jammed between the tray and the surrounding console. It is appreciated that between the panel and the console can be a crevice in which the planar circular object can be located and the side rail can bound a bottom portion of the crevice. As such, when a coin becomes located within the crevice between a slidable tray and a surrounding console, the side rail with the spaced-apart protrusions forces or urges the coin to roll in an opposite direction from movement of the sliding tray.

The plurality of spaced-apart protrusions on the side rail can be in the form of a plurality of inclined steps with each of the steps having a step surface or face that extends upwardly from the side rail and an inclined surface extending from the step surface. In addition, the step surface can face the compartment and extend upwardly from a top surface of the side wall and the inclined surface can slope downwardly from a top edge of the step surface to the top surface of the side rail, the inclined surface sloping downwardly in a forward direction.

Figure 2:
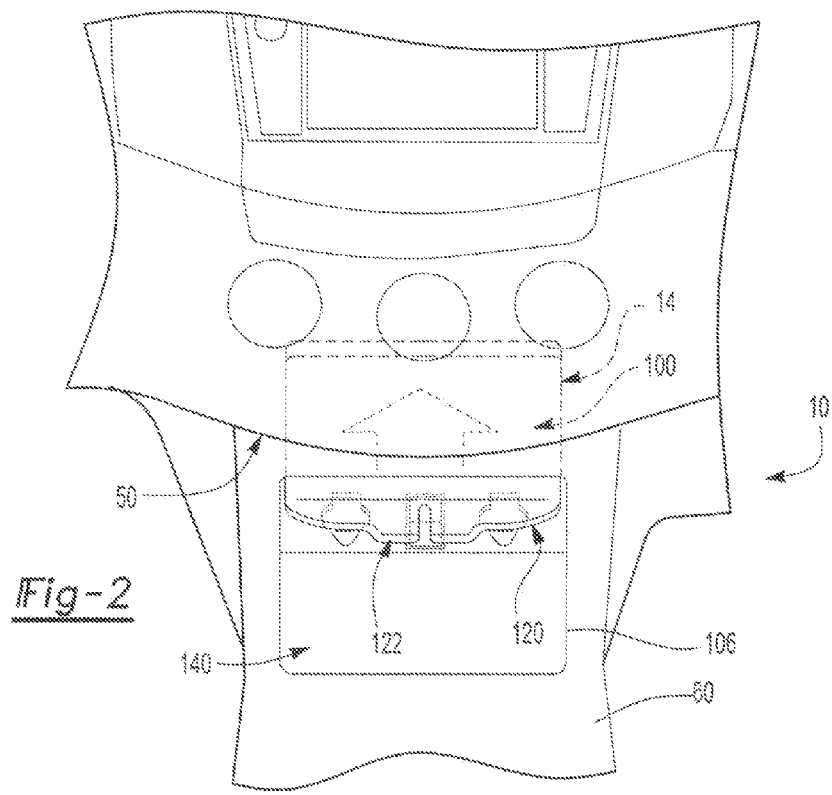
FIG. 2 is an enlarged view of the slidable tray shown in FIG. 1, the slidable tray being in an open position.

Turning now to FIGS. 1 and 2, an instrument panel IP of a motor vehicle is shown along with a center console 10 according to an embodiment of the present invention. The instrument panel IP can include a number of different components such as electronic controls C, knobs K, and the like. In addition, the center console 10 can have a slidable tray 100 that has a length L and a width W. The slidable tray 100 can also have a first end 110, a second end 120, and a planar portion or panel 130 extending between the first end 110 and the second end 120. The second end 120 can have a handle 122 that can be grasped, pushed and/or pulled upon to move the slidable tray 100 from a closed position as shown in FIG. 1 to an open position as shown in FIG. 2. Underneath the slidable tray 100 can be a compartment 140 which is shown more clearly in FIG. 3, the compartment 140 having space to store objects and/or have outlets 142, 144 to plug an electronic cable 146. It is appreciated that the electronic cable 146 can be used to connect to a portable electronic device as is known to those skilled in the art.

The compartment 140 can hold any number of generally small objects such as coins, portable electronic devices, electronic cables, paper receipts, business cards, credit cards, gift cards, and the like. As such, a bottom surface 105 of the tray or panel 100 has a plurality of protrusions 126a-126g that extend therefrom as shown in FIG. 4. The protrusions 126a-126g are spaced apart from each other at one or more distances 127a-127f, the distances 127a-127f being less than the width of an object such as a business card, gift card, and the like, e.g. less than 5 centimeters. As such, when an object located within the compartment 140 is oriented generally flat against the bottom surface 105 of the slidable tray 100 cannot fit between any two adjacent protrusions 126a-126g.

It is appreciated that the slidable tray 100 and the bottom surface 105 can also have a guide rail 128 with optional gear teeth 129, the rail 128 and gear teeth 129 affording for controlled and desired movement of the slidable tray 100 between the closed position and the open position.

Figure 5:
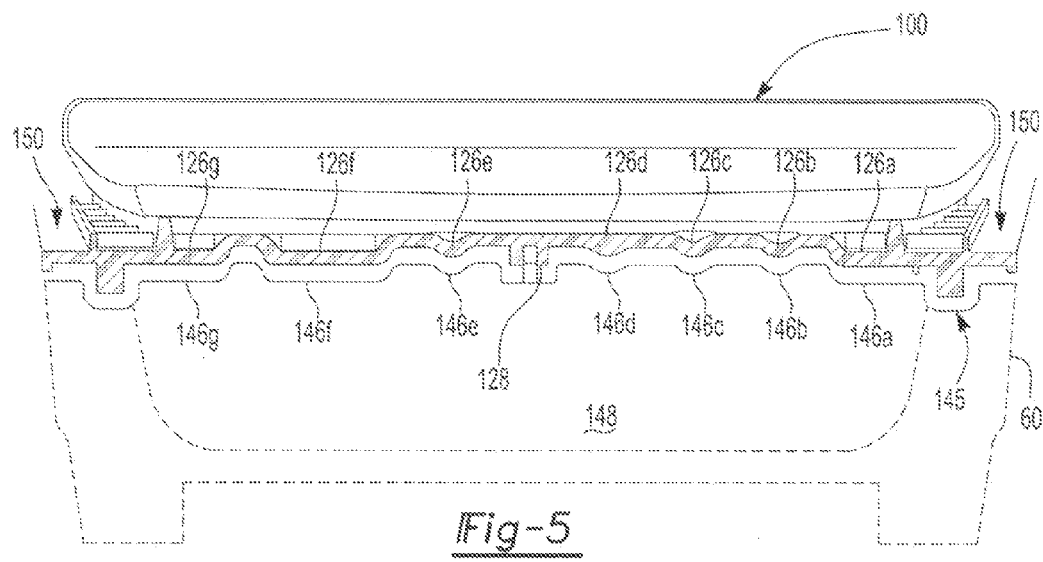
FIG. 5 is an end cross-sectional view of an upper surface and/or edge of a forward portion of the compartment shown in FIG. 3.

Looking now at FIG. 5, an end view of the slidable tray 100 and an upper edge or surface 145 of the compartment 140 are shown. The upper edge or surface 145, which may or may not be part of a back wall 148 of compartment 140, has a plurality of depressions 146a-146g which are complementary and in alignment with the plurality of protrusions 126a-126g. As shown in the figure, this complementary profile of the upper surface or edge 145 allows for the protrusions 126a-126g extending from the bottom surface 105 of the slidable tray 100 to pass therethrough as the tray 100 moves from the closed position to the open position and vice versa. Furthermore, this complementary profile does not let an object such as a business card, credit card, gift card, electronic cable, and the like pass therethrough and potentially jam movement of the slidable tray 100.

Figure 6:
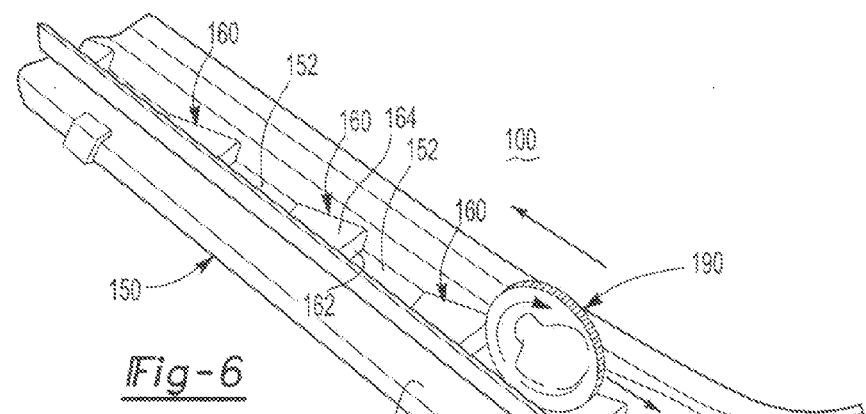
FIG. 6 is a perspective view of a side rail for the slidable tray shown in FIG. 5.

In some instances, the slidable tray 100 can have one or more side rails 150 as shown in FIGS. 5 and 6. The side rail 150 can also have a plurality of spaced-apart protrusions 160 that extend from a top surface 152. The protrusions 160 may or may not be in the form of a plurality of spaced-apart inclined steps, each of the steps having a step face or surface 162 (see FIG. 7) and an inclined face or surface 164. The step face 162 can extend upwardly from the top surface 152 of the side rail 150. In addition, the step face 162 can have a top edge 163 from which the inclined surface 164 extends therefrom and the inclined surface 164 can extend from the top edge 163 in a downwardly direction towards the top surface 152.

It is appreciated that the inclined surface 164 can extend in a forward direction, the forward direction being the direction towards the front of the compartment and/or a motor vehicle which the compartment is located therewithin. As such a back or rearward direction is a direction opposite the forward direction, i.e. a direction towards a back of the compartment 140 and/or a back portion of a motor vehicle which contains the assembly 10.

Figure 7:
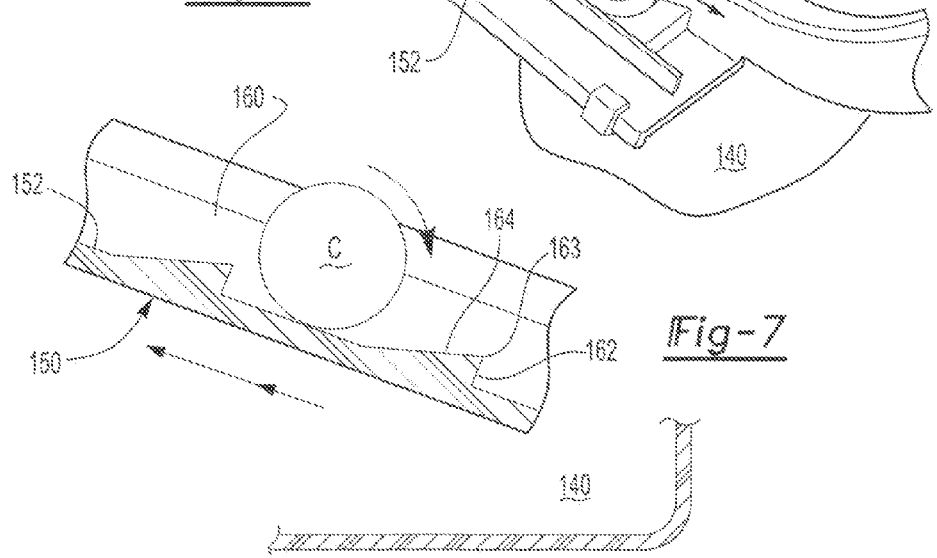
FIG. 7 is a side view of the side rail shown in FIG. 6.

As shown in FIGS. 6 and 7, a planar circular object 190 can be located between the panel 100 and a surrounding console 60. In addition, between the panel 100 and the surrounding console 60 can be a crevice 106 where the planar circular object 190 can be located. In particular, if an individual were to place objects such as coins on top of the planar portion 130 of the slidable tray 100, then a coin can be become located edge-wise in the crevice 106.

When the planar circular object 190 is located within the crevice 106, prior art slidable trays have been jammed by a lack of movement of the object 190. However, the plurality of protrusions 160, and in particular the plurality of inclined surfaces 164, force or urge the object 190 to move or roll in a backward direction when the panel 100 moves in a forward direction. With the movement of the object 190, jamming of the sliding panel 100 is prevented. In addition, if the object 190 moves in the backward direction far enough, it can simply fall into the compartment 140. As such, the plurality of inclined steps provides an anti jamming feature.

It is appreciated that the slidable tray 100 can have both of the anti jamming features, i.e. the plurality of protrusions 126a-126g, extending from the bottom surface 105 of the tray 100 and the side rails 150 with their plurality of inclined steps that afford for a planar circular object to roll in a backward direction when the tray slides in a forward direction. It is also appreciated that the slidable tray could be oriented to slide from the closed position to the open position in a back or rearward direction and planar circular object 190 would be forced or urged in a frontward direction, i.e. in a direction that is opposite to movement of the tray 100.

Given the above disclosure of the slidable tray and its anti-jamming features, it is appreciated that changes, modifications, and the like to the embodiments described herein will be evident to those skilled in the art and yet still not fall outside the scope of the invention. In addition, the slidable tray, side rails, protrusions, and the like can be made from any material known to those skilled in the art such as polymers, metals, alloys, ceramics, wood, etc. As such, it is understood that the teachings above are not meant to be limiting on the scope of the invention and that it is the following claims that define the scope of the invention.

We claim:

1. A slidable tray assembly with an anti-jamming feature comprising:
    a center console having a compartment and a slidable tray that can slide and extend over said compartment when in a closed position, said slidable tray attached to said center console and operable to slide between said closed position and an open position;
    said slidable tray having a plurality of spaced-apart protrusions extending therefrom;
    said plurality of spaced-apart protrusions preventing an object from becoming jammed between said slidable tray and said center console and hindering movement of said slidable tray between said closed position and said open position.

2. The slidable tray of claim 1, wherein said slidable tray has a generally planar bottom surface with said plurality of spaced-apart protrusions extending therefrom, and said compartment has an upper surface with a plurality of spaced-apart depressions, said plurality of spaced-apart depressions complementary and in alignment with said plurality of spaced-apart protrusions of said slidable tray bottom surface;
    said plurality of spaced-apart protrusions and said plurality of spaced-apart depressions preventing an object from becoming jammed between said generally planar bottom surface and said upper surface and hindering movement of said slidable tray.

3. The slidable tray of claim 2, wherein the object is at least one of a business card, a credit card, an electronic cable for connecting to a portable electronic device and a piece of jewelry.

4. The slidable tray of claim 3, wherein any two adjacent protrusions of said plurality of spaced apart protrusions are spaced less than 5 centimeters apart from each other.

5. The slidable tray of claim 1, wherein said slidable tray has a side rail slidingly engaged with said center console, said side rail having said plurality of spaced-apart protrusions; said plurality of spaced-apart protrusions operable for a planar circular object located on said side rail in an opposite direction from said slidable tray moving from said closed position to said open position.

6. The slidable tray of claim 5, wherein said plurality of spaced-apart protrusions are a plurality of inclined steps, each of said plurality of inclined steps having a step surface extending upwardly from said side rail and an inclined surface extending from said step surface.

7. The slidable tray of claim 6, wherein said step surface faces said compartment and extends upwardly from a top surface of said side wall rail, and said inclined surface slopes downwardly from a top edge of said step surface to said top surface of said side rail in a forward direction.

8. The slidable tray of claim 7, wherein said slidable tray and said center console have a crevice therebetween and said side rail bounds a bottom portion of said crevice.

9. The slidable tray of claim 8, wherein said planar circular object is a coin located within said crevice, said coin rolling back towards said compartment when said slidable tray slides in said forward direction from said closed position to said open position.

10. The slidable tray of claim 9, wherein said side rail has a flange bounding said plurality of inclined steps.

11. The slidable tray of claim 10, wherein said flange is a generally vertical flange extending along a length of said side rail.

* * * * *